A. M. COOK.
Wheel-Cultivator.
No. 41,569. Patented Feb. 9, 1864.
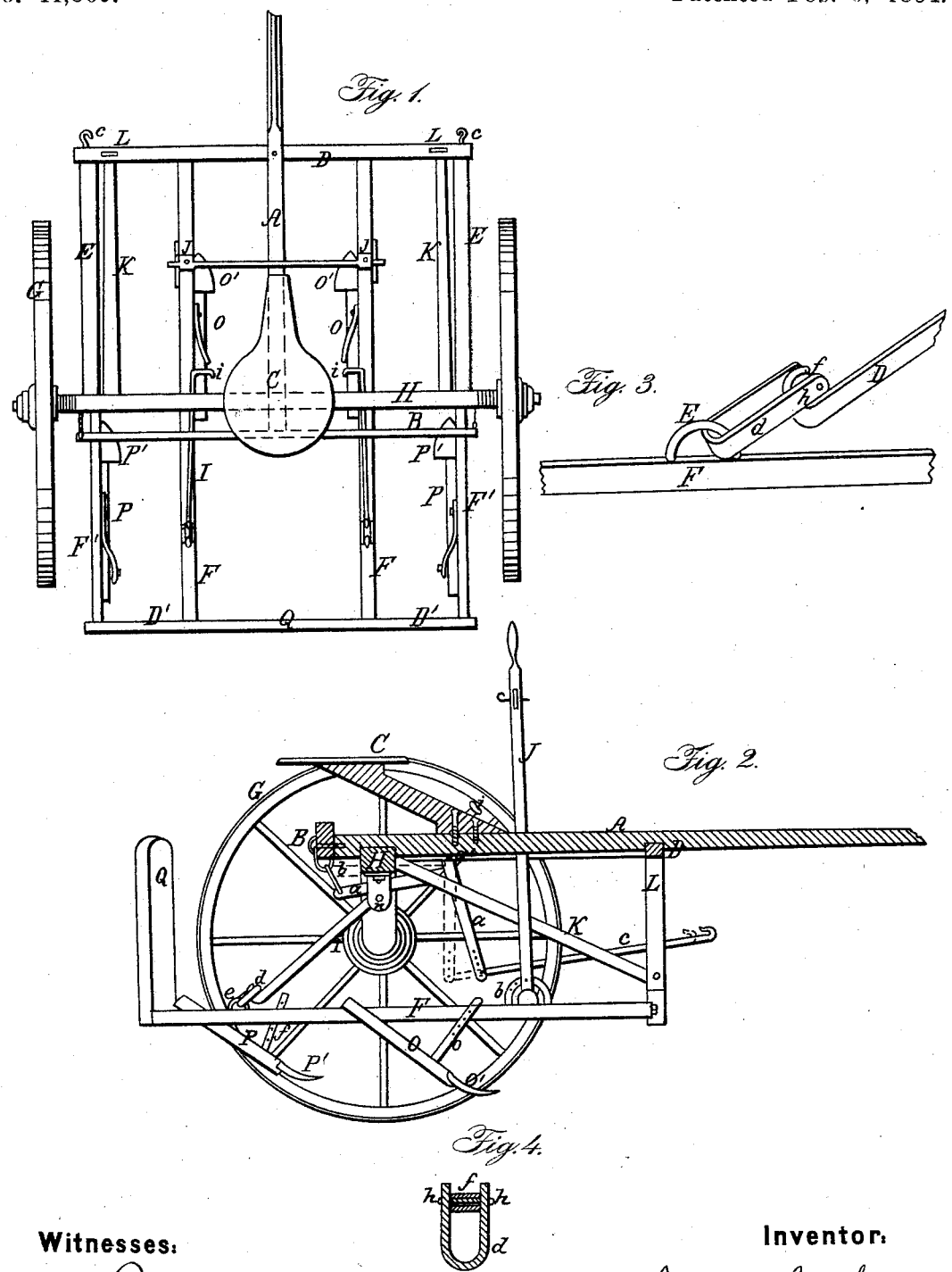
Witnesses:
F. H. Brown
W. F. Clark
Inventor:
A. M. Cook
by W. E. Marrs
attorney

UNITED STATES PATENT OFFICE.

ARLON M. COOK, OF CHICAGO, ILLINOIS, ASSIGNOR TO HIMSELF, ARTEMAS B. VANT, AND HORACE COOK.

IMPROVEMENT IN CULTIVATORS.

Specification forming part of Letters Patent No. 41,569, dated February 9, 1864.

*To all whom it may concern:*

Be it known that I, ARLON M. COOK, of Chicago, in the county of Cook and State of Illinois, have invented certain new and useful Improvements in Cultivators; and I do hereby declare that the following is a full, clear, and exact description thereof, reference being had to the accompanying drawings and the letters and figures marked thereon, which form part of this specification.

In the said drawings, which are hereunto annexed, Figure 1 represents a plan or top view of my invention. Fig. 2 is a longitudinal vertical section thereof at the line $x$ in Fig. 1. Fig. 3 is a perspective view of the device whereby the levers I I are attached or connected to the lower frame-work of the cultivator; and Fig. 4 is a sectional view of the same device.

My invention has reference to that class of corn-cultivators which are suspended upon wheels and stride the rows; and it consists in a novel and useful arrangement for regulating and for equalizing the draft; in a novel mode of attaching the foot-levers, whereby the lower frame is raised up from the ground to the lower frame; and in a novel mode of adjusting the levers, whereby the inside plows are moved from side to side to adapt them to the inequalities and irregularities in the rows.

To enable those skilled in the art fully to understand, construct, and use my invention, I will proceed to describe it with particularity.

A in the annexed drawings represents the draft-pole or guide.

D, E, L, and K represent the upper frame, attached to and sustained by the axle H.

B represents an evener or equalizer attached to the rear end of the draft-pole, and back of the axle, as shown. The said evener is fastened to the draft-pole by a pin or pivot, allowing the ends thereof to move up and down about said pivot.

C represents the seat, which may be adjustable upon the draft-pole, so as to move forward or back, as may be desired, to balance the cultivator properly, when drivers of different weight may occupy the same, by providing additional holes in said draft-pole for the screws through the support of the seat to enter.

G represents the wheels upon which the cultivator is moved about.

F, F', and D' represent the lower frame, to which the standards O P and the shares O' P' are attached. F and F' are connected to the lower end of the upright L by a pivotal attachment, allowing the rear ends thereof, which are connected by the bars D', to be raised or lowered, as desired. The inner beams, F F, to which the levers I I and J J are attached, are also provided at each end with pivoted bearings, allowing said beams F F to have a rolling lateral motion to provide for moving the shares O' O' to the right or left to adapt them to crooks or irregularities in the rows.

Q represents a bow, which joins and stiffens the two parts of the lower frame, and at the same time allows the corn to pass beneath without breaking it down.

At each end of the evener B there is attached a clevis, to which the angle or bent levers $a$ $a$ are connected by the links $b$ $b$ at one end thereof, and to the other end are attached the draft-rods $c$ $c$. The fulcrum of the levers $a$ $a$ is at $a'$, being fastened to the beams E by a bolt. By this arrangement of the evener B and the bent levers $a$, when one horse moves in advance of the other the end of the evener to which the former is attached moves down, and the lower arm of said lever is thrown forward from a vertical position, in which position the leverage is greatest, and the farther it is moved forward the less advantageous said leverage becomes, whereas, with the other horse the lower arm is drawn back toward the vertical position, and the leverage upon which he operates becomes more and more advantageous until it reaches the vertical position, when it is prevented from moving back past said position by the upper arm of the lever coming in contact with the axle H. There are different holes made in said lower arm, to which the draft-rods are attached, whereby the said lower arm may be shortened or lengthened to favor either horse, as may be desired.

By means of the adjustable straps or braces $o$ and $p$ the shares O' P' may be adjusted to run to any depth required.

The levers I I are provided at their upper ends with the steps or rests $i$ $i$, so as to be operated upon readily by the feet of the driver. The design of these levers is to raise the shares up out of the ground and off the ground, when desired, having their fulcrums at $g$. The device whereby the levers I I are connected to the pivoted bars F F is clearly shown in Figs. 3 and 4, $e$ representing a staple attached firmly to F and arranged longitudinally with respect thereto, and $d$ being a strap, bent or curved, as shown, in the form of the letter U, and $h$ a pin passing through the ends of the said U-shaped strap, upon which the roller $f$ revolves, and the lower end of the lever I being provided with a hook or curved end, as shown. By this arrangement the utmost freedom is allowed for the lateral rotating movements of the bars F F, and when the upper end of the lever is pressed down the lower end slides through the curved strap $d$ upon the roller $f$, which thereby materially decreases the friction of the parts, and thus renders them much more durable than would otherwise be the case.

The levers J J are attached to the pivoted bars F F, and are the means whereby the said bars are adjusted or rotated laterally for the purpose of adapting the shares O' O' to any curves or irregularities in the rows. These levers are attached to the said bars F F by a pivot-joint, allowing said levers to move forward or backward, as desired, but rigidly fixed thereto, so far as lateral motion is concerned. The arc $l$, provided with perforations, as shown, is designed to adjust said levers in any required position, so as to have the handles or upper ends thereof at a convenient distance from the driver, so that he can readily reach them, as the seat C may be adjusted toward the front or rear of the machine, as aforesaid. This adjustment is effected by moving said levers to the required position, and then passing a pin through said levers and one of the holes in the arcs $l$.

By the position of the evener B upon the draft-pole and behind the axle H, and by the arrangement thereof with the bent levers $a\ a$ and draft-rods $c\ c$, the pressure upon the necks of the horses is entirely removed, rendering the labor of drawing the machine much lighter, thereby greatly alleviating the labor of the horses in working the cultivator. This is effected by placing the evener B behind the axle upon the draft-pole, so that the axle serves as a fulcrum, while the draft-pole is the lever, and the draft of the horses is the power, drawing down upon the rear end of the draft-pole and tending to raise the front end, thus relieving the horses, as aforesaid.

In case the shares should come suddenly in contact with some impediment or obstruction—as a stone or root—the extra force which is necessarily exerted by the horses, instead of forcing the shares downward and more deeply embedding them, by this arrangement acts downward upon the rear end of the cultivator or the draft-pole, which, being fixed firmly to the front part of the frame, causes the shares to rise and greatly facilitates the extrication thereof from the said difficulty.

Having thus described my improved cultivator, I will now state what I claim as new and desire to secure by Letters Patent:

1. The combination and arrangement of the evener B, the bent levers $a\ a$, and the draft-rods $c\ c$ with draft-pole A and axle H, all arranged and operating substantially as and for the purposes herein delineated and set forth.

2. The combination and arrangement of the U-shaped strap $d$, the anti-friction roller $f$, and the staple $e$ with the adjustable bars F and the levers I, constructed with a curved end, substantially as and for the purposes herein shown and specified.

ARLON M. COOK.

Witnesses:
W. E. MARRS,
WM. M. WOOLLEY.